United States Patent [19]
Gaddi

[11] Patent Number: 4,637,277
[45] Date of Patent: Jan. 20, 1987

[54] DEVICE FOR CONTROLLING THE REGULATION IN AN AUTOMATIC TRANSMISSION

[75] Inventor: Bruno Gaddi, Pisa, Italy

[73] Assignee: Piaggio & C. S.p.A., Genoa, Italy

[21] Appl. No.: 660,398

[22] Filed: Oct. 12, 1984

[30] Foreign Application Priority Data

Oct. 17, 1983 [IT] Italy ................... 23325 A/83

[51] Int. Cl.⁴ ................. B60K 41/14; F16H 11/06
[52] U.S. Cl. .................................. 74/865; 474/12; 474/14
[58] Field of Search ............... 74/865, 859, 864, 867, 74/846, 856, 857; 474/12, 13, 14, 18, 28, 31

[56] References Cited

U.S. PATENT DOCUMENTS

| | | | |
|---|---|---|---|
| 3,052,132 | 9/1962 | Dittrich et al. | 474/18 X |
| 3,426,624 | 2/1969 | Karig et al. | 74/846 |
| 3,596,528 | 8/1971 | Dittrich | 474/28 X |
| 3,600,961 | 8/1971 | Rattunde | 74/867 X |
| 3,893,344 | 7/1975 | Dantlgraber et al. | 74/867 X |
| 4,152,947 | 5/1979 | van Deursen et al. | 474/28 X |
| 4,228,691 | 10/1980 | Smirl | 474/28 X |
| 4,350,491 | 9/1982 | Steuer | 474/12 |
| 4,369,675 | 1/1983 | van Deursen | 74/864 |
| 4,403,975 | 9/1983 | Rattunde | 474/28 X |
| 4,519,790 | 5/1985 | Yamamuro et al. | 474/28 |

Primary Examiner—Leslie A. Braun
Assistant Examiner—David Novais
Attorney, Agent, or Firm—Hedman, Gibson, Costigan & Hoare

[57] ABSTRACT

This invention relates to an improvement in devices for controlling the transmission ratio variation in continuous variators disposed between a vehicle engine and its wheels. The improvement comprises a supplementary control which modifies that action on the device which is dependent on the engine feed, in particular to obtain effective engine braking action during vehicle deceleration.

3 Claims, 1 Drawing Figure

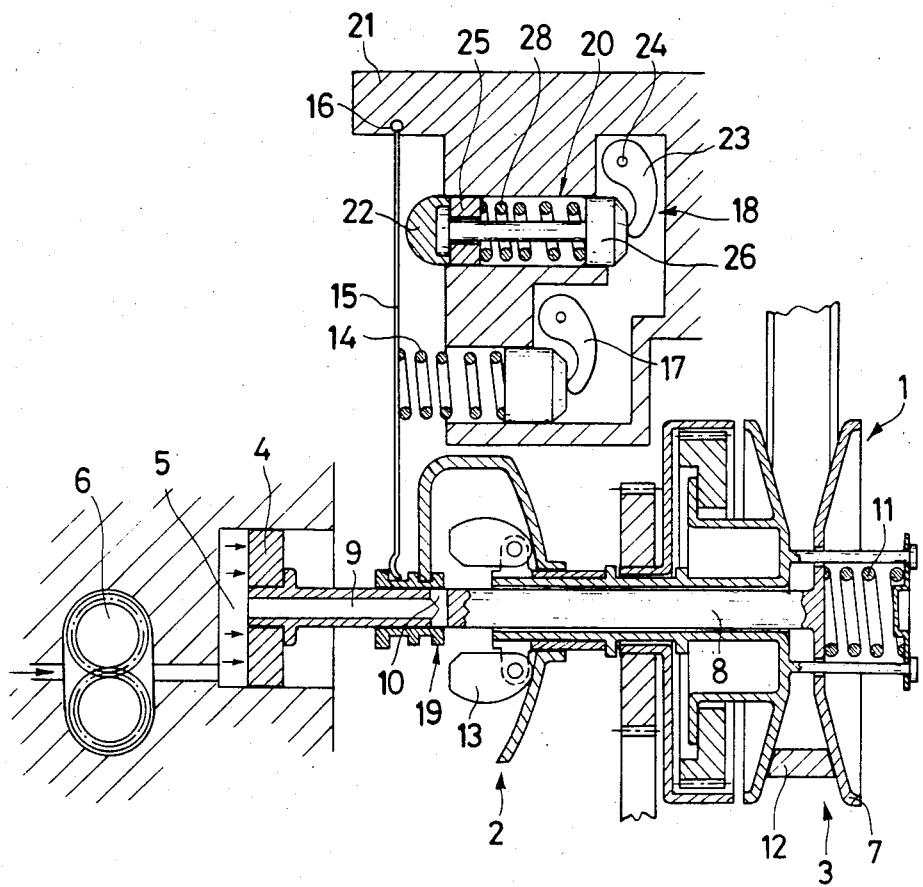

DEVICE FOR CONTROLLING THE REGULATION IN AN AUTOMATIC TRANSMISSION

The driver of an engine-driven vehicle provided with a manual gear box is able to make any one vehicle speed correspond to a number of engine speeds equal to the number of gear ratios available, by using the engine not only to overcome the resistance to motion of the vehicle but also as a brake by utilizing both its resistance to rotation due to friction and pumping losses, and its capacity for absorbing kinetic energy when accelerated by passing, more or less suddenly, from higher to lower gear ratios.

In the case of automatic transmissions, in particular in those of continuously variable ratio, the regulating system normally operates in such a manner as to make an engine feed increase result in a corresponding increase in engine speed, independently of the vehicle speed, in accordance with a predetermined relationship, which tends to favor either the requirement of minimum fuel consumption or the requirement of maximum acceleration, and only in a few designs can this be chosen at the discretion of the driver.

Consequently, when the feed is shut off, the transmission regulating system tends to increase the ratio of vehicle speed to engine speed, thus reducing the engine braking effect. Thus, if it is required to use the engine braking capacity in the case of automatic transmissions, it is necessary to act on their automatic system by means of appropriate devices which can be controlled by the driver in order to vary the relative governing relationship in the required sense, or alternatively to cut-out the automatic system altogether in order to enable the driver to choose the required ratio.

Known designs of such devices are more or less complicated, and thus substantially increase the transmission cost.

The object of the present invention is therefore a device which enables the driver to act on the automatic system of engine-driven vehicle transmissions in such a manner as to vary the relationship which governs their operation at will, and in particular to utilize the braking capacity of the engine, the device being constructionally very simple and particularly suitable for transmissions of continuously variable ratio incorporating a hydraulic servo-control.

This object is attained according to the invention by a device for correcting the relationship which governs the operation of an automatic system for controlling the transmission ratio variation between a vehicle engine and its wheels, comprising a speed regulator of which the mobile element is subjected to the thrust of centrifugal masses rotating at a speed proportional to the speed of the transmission output shaft, and to the thrust of a sensor for sensing the engine feed level, characterised by comprising an elastically yieldable element which can be controlled so as to act on said mobile element of the regulator in opposition to the thrust of the centrifugal masses.

The essential characteristics of the device according to the invention and its implementation will be apparent from the embodiment shown on the single accompanying FIGURE, which represents an overall schematic diagram of a device according to the invention.

For its better understanding, the device is shown diagrammatically by way of example in the accompanying FIGURE in terms of its application to a follower-type regulating system for a transmission of the belt and expandable pulley type, indicated overall by 1, comprising a speed regulator 2 rotating at the same speed as the driven pulley 3, an operating element constituted by the piston 4, which is slidable in the cylinder 5, this latter being fed with suitable drive fluid by the pump 6 and connected to the slidable half pulley 7 by way of the shaft 8, and further comprising a follower valve constituted by the collar 19 of the regulator 2 and by the cavity 9 of said shaft 8.

The collar 19 regulates the opening of the discharge port 10 and thus the pressure of the drive fluid, and consequently the equilibrium position of the half pulley 7 which slides under the action of the forces applied by the piston 4, by the spring 11 and by the belt 12. The regulator indicated overall by 2 is in equilibrium under the action of the centrifugal forces on the masses 13 together with the action of the force of the spring 14 applied to the lever 15, which is pivoted at 16 and connected to the collar 19 by way of a suitable thrust bearing. The spring 14 can be variously preloaded by the lever 17, which is suitably connected to the engine feed control, not shown, so as to oppose the speed-dependent forces, ie the centrifugal forces on the masses 13 in the case of the present example.

The device which according to the invention modifies the influence of the engine feed level on the speed regulation is constituted essentially by a preloaded elastic piston 18 slidable in a cylindrical guide 20 in the base 21 so that its head 22 is able to make contact with said lever 15 acting on the regulator collar, under the thrust of the lever 23 which can be operated by way of its shaft 24 under the action of a suitable control element, not shown in the FIGURE, which is operated by the vehicle driver.

Specifically, the piston 18 is constituted by the bored element 25 which carries the head 22, and by the element 26, these elements being coupled together prismatically in the axial direction and kept spaced apart so that they abut against their respective shoulders by a preloaded spiral spring 28. The spring 28 has a characteristic, ie a relationship between its deflection and its reaction, which is generally non-linear as shown on the FIGURE by the fact that the relative turns are differently spaced apart.

The characteristic of the spring 28 can be of the same type as that of the spring 14 which is preloaded by the lever 17 connected to the engine feed control, and in particular be of exponential type.

When the piston 18 comes into contact with the lever 15, it is able, in cooperation with the spring 14, to react to the movements of the lever itself in opposition to the action of the speed-dependent forces of the regulator, this action being exerted by way of the collar 19, thus modifying the relationship between the regulated speed and the feed level, ie the drive torque, to a more or less substantial extent according to the degree of preloading of the spring 14, which can be further increased beyond its initial preload by increasing the travel of the lever 23. In particular, it is possible to maintain a large thrust against the lever 15 even when the thrust of the spring 14 is minimal, ie when the engine feed is shut off, so as to completely oppose the influence of the speed and thus maintain the transmission at its lowest ratio and thus cause the engine to act as a brake, as explained heretofore.

In the illustrated example, the forces exerted on the regulator collar by the centrifugal masses can be very small because the collar does not have to overcome any resistance other than that due to its own sliding along the other element of the regulator valve and possible minimal resistances due to pressure variations at the fluid discharge port, and thus the force which the vehicle driver has to exert on the feed regulating control and in particular on the control according to the invention can be correspondingly very small, and thus does not influence the driving comfort of the vehicle, especially in the case of a motor cycle.

I claim:

1. A transmission system for continuously varying a transmission ratio between a vehicle engine and its wheels, including a pulley comprising a pair of half pulleys, an operating element arranged to vary the transmission ratio, a shaft in communication at one end to the operating element and at the other end to means for displacing said shaft, a speed regulator mounted on the shaft comprising centrifugal masses and an axially displaceable regulator collar, a first lever in communication at one end with the regulator collar, a first yieldable member preloaded by a second lever connected to an engine feed control which provides a force on the regulator collar through the first lever in opposition to a speed dependent force exerted on the regulator collar by the centrifugal masses, the improvement comprising a second yieldable element preloaded by a manually controlled means connected to said second yieldable element providing a force on the regulator collar through the first lever independent of the force of the first yieldable member so as to oppose the influence of an engine speed thereby maintaining the transmission system at its lowest ratio.

2. A system as defined in claim 1 wherein said second yieldable element is slidable in a fixed seat between operating and non-operating positions, said second yieldable element having a head at one end for contacting said first lever and a stem at the other end in communication with said manually controlled means.

3. A system as defined in claim 1, wherein said first and said second yieldable elements are springs having exponential characteristics.

* * * * *